Feb. 23, 1937.  R. E. LEAVENS  2,071,931
BANANA PEELER
Filed March 14, 1935    2 Sheets-Sheet 1

Inventor
Robert E. Leavens
By Hardway Cather
Attorneys

Feb. 23, 1937.   R. E. LEAVENS   2,071,931
BANANA PEELER
Filed March 14, 1935   2 Sheets-Sheet 2

Inventor
Robert E. Leavens
By Hardway Cathey
Attorneys

Patented Feb. 23, 1937

2,071,931

UNITED STATES PATENT OFFICE 2,071,931

BANANA PEELER

Robert E. Leavens, Houston, Tex.

Application March 14, 1935, Serial No. 11,029

7 Claims. (Cl. 146—5)

This invention relates to a banana peeler and embodies certain improvements over that type of banana peeler disclosed in my co-pending application filed May 15, 1934 under Serial No. 725,738.

An object of the invention is to provide an implement especially designed for removing the peeling from fruit such as bananas, and which also is adapted for separating the peeled fruit, if desired.

Another object of the invention is to provide an implement by means of which the peeling may be removed from the fruit without touching the fruit.

A still further object of the invention is to provide an implement of this type embodying a chute for the peeled fruit, a blade for slitting the peeling at one end of the fruit, guides for stripping the peeling from the fruit as the fruit is advanced by hand through the chute, and a blade which may be moved into active position to separate the peeled fruit into halves, if desired, said blade being movable to inactive position so that the fruit may be peeled and left whole.

A still further feature of the invention resides in the provision of novel means for mounting the peel-slitting blade.

With the above and other objects in view, the invention has particular relation to certain novel features of construction, operation, and arrangement of parts, an example of which is given in this specification and illustrated in the accompanying drawings, wherein.

Figure 1:
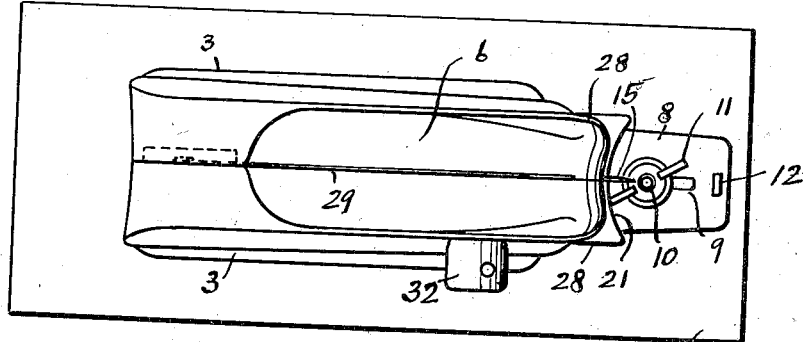
Figure 1 shows a plan view of the peeler.
Figure 2:
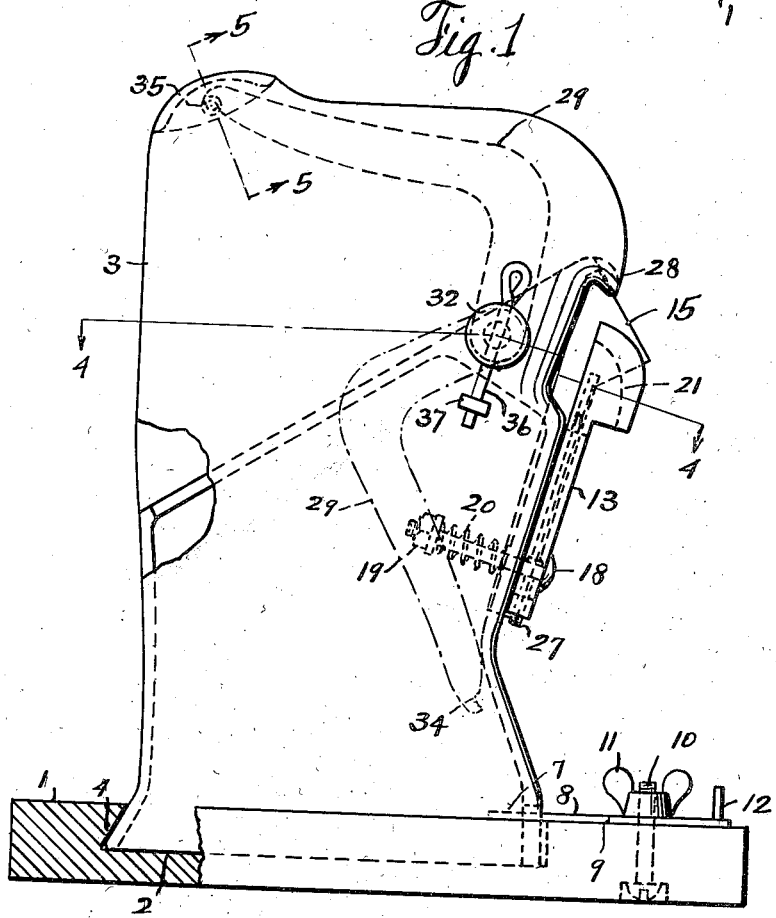
Figure 2 shows a side view partly broken away and partly in section.
Figure 3:
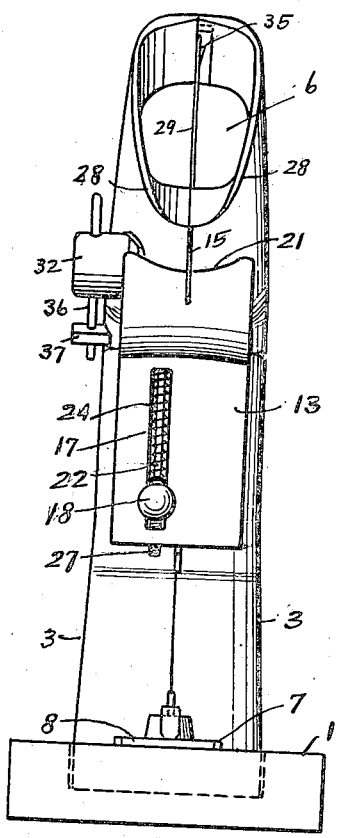
Figure 3 shows a front elevation.

In the drawings the numeral 1 designates a suitable base having a countersunk seat 2 in the upper face thereof to receive the mating sections 3, 3, of the body. These sections are substantially similar in shape and are complemental and are cast hollow, or shell-like, as indicated in Figures 2 and 4.

One end of the countersunk portion 2 is undercut, as at 4, and the adjacent margin of the lower end of the body is correspondingly shaped to fit into the undercut portion 4.

The sections have the inside complemental webs 5, 5, in alignment, forming the bottom of the chute 6 through the body leading from the upper end thereof downwardly and rearwardly. The forward side of the body has a transverse slot 7 adjacent the lower end thereof, and an inwardly widened clutch plate 8, fitted into this slot. This plate is flexible and serves to hold the body seated in the seat 2 as well as to hold the sections of the body yieldingly together, but to permit the upper ends of said sections to be spread apart to receive fruit of larger than ordinary sizes. Secured to the base 1 and extending upwardly through the lengthwise slot 9, in said plate, there is a set-bolt 10 whose upper end is threaded to receive the wing-nut 11 which may be screwed down against the plate 8 to secure the same in place. The outer end of the plate has a grip 12 for a purpose to be hereinafter stated.

Figure 4:
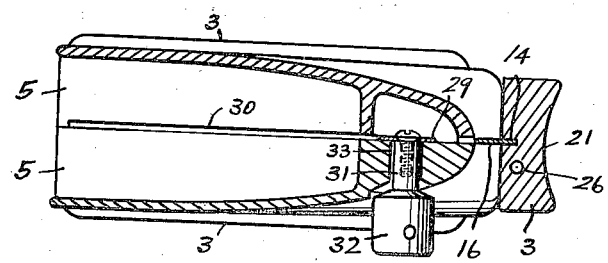
Figure 4 shows a cross-sectional view taken on the line 4—4 of Figure 2.
Figure 5:
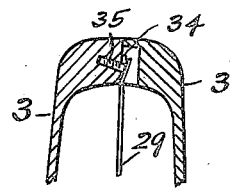
Figure 5 shows a fragmentary sectional view taken on the line 5—5 of Figure 2.
Figure 6:
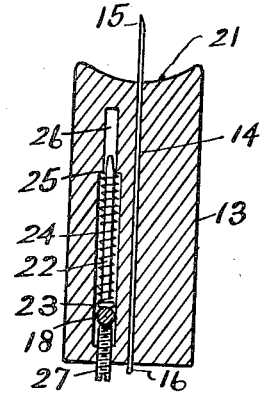
Figure 6 shows an edge view, partly in section, of the knife holder and knife.
Figure 7:
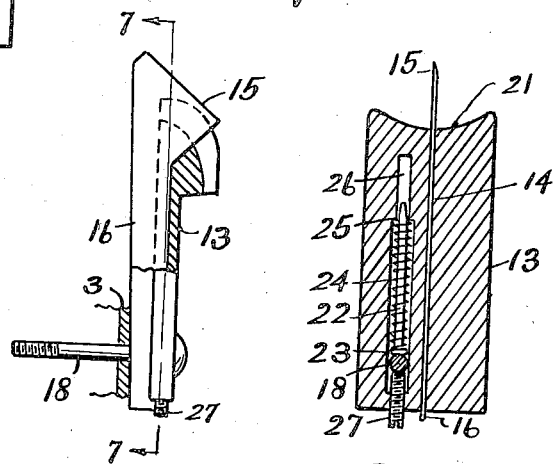
Figure 7 shows a sectional view thereof taken on the line 7—7 of Figure 6.

There is a knife holder 13 at the forward side of the body which is provided, on its inner side, with a vertical groove 14 whose upper end is outwardly widened, and a knife 15 is seated in the widened portion of the groove and has an extended shank 16 clamped in the groove in the inner side of the holder, said shank being extended inwardly, forming a guide which works between the body sections 3, 3, as more clearly illustrated in Figure 4.

The knife holder is also proivded with a vertical slot 17 and a bolt 18 is fitted inwardly through said slot and through the adjacent wall of one of the sections 3, and the inner end of the bolt is threaded to receive a nut 19. Surrounding said bolt and interposed between said wall of said section and the nut there is a coil spring 20 which holds the bolt head drawn closely against the knife holder to secure said holder in place, as more clearly shown in Figure 2.

The upper end of the knife holder is outwardly thickened at its upper end and is formed with an arcuate guide 21 which is in alignment with the knife 15.

Housed within the holder slot 17 there is a vertically extended rod 22 whose lower end rests against the bolt 18. The lower end of this rod has a head 23 and surrounding the rod there is a coil spring 24 whose lower end rests against said head and whose upper end rests against an internal annular shoulder 25 around the guide 26 in which the rod 22 works. Screwed into the lower end of the knife holder is an adjusting screw 27 whose upper end works against the bolt 18. The spring 24, accordingly, normally holds the knife holder and knife in position but they may be adjusted upwardly or downwardly by a corresponding adjustment of the screw 27.

The upper end of the body has the forwardly extended diverging guides 28, 28, above the guide 21 and on opposite side of the chute 6. In use, a banana may be grasped by the hand and moved toward the inlet end of the chute while in contact with the knife 15, and the peeling at the advancing end of the banana will be slitted, and the slitted margins will pass on opposite sides of the guides 28. As the fruit is passed through the chute 6, these guides force the peeling to separate, and the peel spreads apart and passes over the oval upper end of the body as the peeled fruit passes through the chute into a suitable receptacle provided to receive the fruit. It is thus not necessary to touch the peeled fruit during the operation.

Within the chute 6 there is an angularly shaped blade 29. This blade is arranged to work through a slot 30 between the webs 5. The forward end of the blade 29 is securely fastened to the inner end of the shank 31 of the knob 32. The shank 31 is rotatable in a lateral bearing 33 through one of the sections 3. By turning the knob, the blade 29 may be moved to active or inactive position. The free end of the blade 29 is formed with a hook 34 to engage over the head of a screw 35 which is screwed into the inner side of one of the sections 3 at the upper end of the body. The blade, when in this active position, extends across the chute 6 and is centrally located so as to divide the peeled fruit into halves. In order to secure the blade in active position, a pin 36 may be inserted through a transverse bearing through the knob and also through a bearing in the lug 37 which extends out from the corresponding side of the body. This key 36 may be removed, and the end of the blade 29 disengaged from the screw 35 and by suitably turning said knob the blade may be retracted downwardly through the slot 30 into inactive position so that the peeled fruit will be left whole.

The key 35 is screwed into the section 3 at such an angle that the head of the screw will diverge upwardly from the adjacent face of said section so that when the blade 29 is moved toward active position, its free end will ride against the outwardly diverging head of the screw until the hook 34 has cleared said head, the flexibility of the blade will thereupon cause the hooked end of the plate to snap over the head and engage the screw in an obvious manner.

When it is desired to move the blade 29 into inactive position, the key 36 may be removed, and the knob 32 turned to elevate the hook 34 above the head of the screw 35, and the knob 32 may then be forced inwardly to move the blade 29 laterally so that when the knob is turned in the other direction, that is, to the left, the hook 34 will clear the screw head, and the blade 29 may be moved to said inactive position.

When it is desired to dismember the peeler for cleaning purposes, the nut 11 may be loosened, and the plate 8 moved outwardly to clear the slot 7, and the body may then be lifted out and separated and readily cleansed.

The drawings and description disclose what is now considered to be a preferred form of the invention by way of illustration only, while the broad principle of the invention will be defined by the appended claims.

What I claim is:

1. An implement of the character described comprising a body formed of complemental, upstanding, sections and having a chute between the sections, means for holding the sections yieldingly together, a knife arranged in advance of the chute, a divider guide between the knife, and chute, and a knife movable into active position across the chute, and into inactive position clear of the chute.

2. An implement of the character described comprising a body formed of mating sections and having a chute between the sections, means maintaining the sections yieldingly in adjacent relation, a yieldably mounted knife arranged in advance of the chute and a divider guide at the inlet end of the chute.

3. An implement of the character described comprising a body composed of complemental sections, means for maintaining the sections in assembled relation, said body having a chute between the sections, said sections being movable toward and from each other to vary the capacity of the chute, a knife arranged in advance of the chute, and a divider guide between the knife and chute.

4. A peeler comprising a body composed of complemental sections, means for maintaining the sections in assembled relation, the body having a delivery chute between the sections, a knife holder adjustably mounted on the body, means for adjusting the holder, a knife on the holder arranged in advance of the chute, a divider guide between the knife and chute and a knife movable into active position across the chute and into inactive position clear of the chute.

5. A banana peeler comprising a base having a seat, a body formed of complemental sections and seated in the seat, said sections having aligned slots adjacent the base, a flexible plate secured to the base and projecting into the slots and holding the body seated and maintaining the sections yieldingly in adjacent relation, said body having a chute between the sections, a knife on the body in advance of the inlet end of the chute, a divider between the knife and said end of the chute, and a knife movable into position across the chute.

6. A banana peeler comprising a base having a seat, a body formed of complemental sections and seated in the seat and having a guideway through between the sections, a flexible anchor on the base in engagement with the sections and forming means for retaining the body in its seat and being effective to hold the sections yieldingly together, a knife on the body in advance of the inlet end of the guideway, a divider arranged at the inlet end of the guideway and a knife movable into one position across the guideway and into another position clear of the guideway.

7. An implement of the character described comprising a body formed of mating sections and having a chute between the sections, means maintaining the sections yieldingly in adjacent relation, an adjustable knife mounted in advance of the chute, means for adjusting said knife, and a divider guide at the inlet end of the chute.

ROBERT E. LEAVENS.